(12) United States Patent  
Henderson

(10) Patent No.: US 8,060,031 B2  
(45) Date of Patent: Nov. 15, 2011

(54) HANDS-FREE CELL PHONE JEWELRY

(76) Inventor: Francella Henderson, Inglewood, CA (US)

( * ) Notice: Subject to any disclaimer, the term of this patent is extended or adjusted under 35 U.S.C. 154(b) by 174 days.

(21) Appl. No.: 12/462,593

(22) Filed: Aug. 5, 2009

(65) Prior Publication Data

US 2011/0034134 A1 Feb. 10, 2011

(51) Int. Cl.
*H04W 88/02* (2009.01)
(52) U.S. Cl. .............. 455/90.3; 455/575.7; 455/575.8
(58) Field of Classification Search .............. 455/90.1, 455/90.2, 90.3, 90, 575, 575.1, 575.2, 421, 455/469.1, 100, 66.1, 344, 346; 381/24; 63/3
See application file for complete search history.

(56) References Cited

U.S. PATENT DOCUMENTS

| | | | |
|---|---|---|---|
| 5,757,929 A | 5/1998 | Wang et al. | |
| 6,185,410 B1 * | 2/2001 | Greene | 455/100 |
| 6,594,370 B1 | 7/2003 | Anderson | |
| 6,728,556 B1 * | 4/2004 | Whitley | 455/575.1 |
| 6,954,659 B2 | 10/2005 | Tushinsky et al. | |
| 7,142,826 B2 | 11/2006 | Olivier et al. | |
| 7,236,751 B2 | 6/2007 | Ono | |
| 7,428,429 B2 | 9/2008 | Gantz et al. | |
| D590,290 S | 4/2009 | Lopez | |
| 2004/0230435 A1 * | 11/2004 | Douros | 704/275 |
| 2007/0036370 A1 * | 2/2007 | Granovetter et al. | 381/311 |
| 2009/0013719 A1 * | 1/2009 | Loving et al. | 63/1.12 |
| 2010/0161338 A1 * | 6/2010 | Tofighbakhsh | 704/273 |
| 2011/0053660 A1 * | 3/2011 | Park et al. | 455/575.1 |

* cited by examiner

*Primary Examiner* — Diane Mizrahi
(74) *Attorney, Agent, or Firm* — Robert J. Lauson; Lauson & Tarver LLP

(57) ABSTRACT

A voice-activated mobile phone in the form of jewelry includes a necklace element for suspending the phone around the neck of a user, a phone element being a part of the necklace and a pendant hanging from the necklace. The phone element is voice activated so that a user can send and receive calls without having to physically manipulate the phone. The phone element may be disguised as a part of the necklace by virtue of a fancifully designed cover that fits over the phone portion of the device.

13 Claims, 4 Drawing Sheets

HANDS-FREE CELL PHONE JEWELRY

BACKGROUND

Cell phones are well known in the art, as are voice-activated cell phones. Frequently it may be difficult to carry and use a cell phone when carrying other items such as shopping or grocery bags. For this reason, there is a need for a cell phone that remains close to a user's head in the event of a call, and which can be voice activated when the user's hands are otherwise occupied.

U.S. Pat. App. No. 2009/0013719 to Loving, et al. discloses a cell phone necklace. Although this device allows a user to wear a cell phone as necklace, the device serves only as a holder for "flip" style phones that fold closed on a support held by the necklace.

U.S. Pat. No. 7,428,429 to Gantz et al. discloses a hands-free personal communication device to be worn about a user's neck. This device comprises an elastic neckband that forms different neck-anchoring shapes according to user preference. While this device comprises a cellular phone, it does not take the form of a necklace and therefore cannot blend in with other accoutrements worn by a user. The device also lacks a voice control feature.

U.S. Pat. No. 7,236,751 to Ono discloses a strap worn around the neck with input buttons for controlling attached portable devices. While this device supports telephony, it requires a complicated plug and cord mechanism to attach a conventional cell phone to the neck strap which controls the phone. Furthermore, other than the connecting cable, the cell phone is not attached to the device.

U.S. Pat. No. 7,142,826 to Oliver et al. discloses a portable radiotelephone and communication system for use by persons in an emergency who cannot access a phone. The device interfaces with a cordless phone through which it communicates. Although this device comprises a necklace phone, it lacks the ability to communicate through cellular networks and is not voice activated.

U.S. Pat. No. 6,954,659 to Tushinski, et al. discloses a fashion accessory with a wireless signal alerting device. While the Tushinski device is capable visually identifying the presence of a mobile communication signal, it has no other telephonic function.

U.S. Pat. No. 6,594,370 to Anderson discloses a wireless personal communication apparatus in the form of a necklace. Although this device contains a cell phone within the necklace, it requires users to wear a wireless earpiece which remains in communication with the device.

U.S. Design Pat. No. D590,290 to Lopez discloses decorative jewelry for a cell phone. This device comprises pendant type jewelry to be affixed to the phone in order to accent its appearance. While incorporating both jewelry and a cell phone, the device fails to claim a necklace worn by a user comprising a phone.

It is therefore an object of the present invention to provide a necklace phone comprising a necklace and cell phone to be worn around a user's neck. A further object of the present invention is to provide a voice-activated cell phone obviating the need for physical contact with the phone to send and receive calls. A further object of the present invention is to provide a voice-activated cell phone necklace that may be worn as an ordinary piece of jewelry. These and other objects will be more fully developed in the following Summary, Description and Claims.

SUMMARY

The present invention is a mobile phone device in the form of a necklace to be draped around the neck of a user and voice-activated. The voice-activated mobile phone is typically contained within a decorative case enabling the phone to blend in with the necklace, and may appear as a connector or pendant. The phone receives voice commands from the wearer via a microphone. A speaker incorporated into the phone allows a wearer to hear communications from the phone.

The necklace portion of the device forms a length of chain or other stranded material and can take the form of costume jewelry. The decorative case containing the phone connects to the ends of the necklace portion of the device. Alternatively, the decorative case depends from the necklace as a pendant.

The decorative case includes speaker access allowing sound to pass through the case to reach a wearer. The decorative case also includes microphone access wherein the mobile phone microphone detects voice commands from a person wearing the device. Alternatively, the speaker and microphone use the same access.

The decorative case includes button access, allowing access to control buttons associated with the phone. The decorative case may also have at least one multifunction button to activate phone features. In some instances, the decorative case may be fancifully shaped or representative of articles with distinct front and back sides. In these instances, buttons for controlling features of the voice-activated phone can be located on the back side of the decorative case.

Since the device serves as costume jewelry, it may be made into in a variety of forms and styles. Both the necklace element and decorative case may comprise fanciful shapes such as exaggerated links or specific sculptures.

The phone is either supported by the ends of the necklace or attached as a pendant. When attached as a pendant, the phone may contain a retractable tether enabling a wearer to pull it away from the necklace, automatically retracting the tether to a biased position thereafter.

The phone component includes a processing unit, speaker and microphone. The processing unit deactivates the microphone when the speaker activates, and reactivates the microphone when the speaker is deactivated. The processing unit is also capable of distinguishing a wearer's voice from among other sounds.

The device may include inputs for connecting to computers or other processing devices for programming the phone. It may also accept an audio plug for attaching audio devices. The input may also serve to recharge the battery while the device is plugged in. Alternative versions may be equipped for communications over wireless protocols with other devices, and the necklace may serve as an antenna to improve signal transmission.

DESCRIPTION

The present invention is drawn to a wearable voice-activated mobile phone device. The device comprises a necklace to be disposed around the neck of a user. Attached to the necklace is a voice-activated mobile phone contained within a decorative case enabling the phone to either blend in with the necklace or appear as a pendant. The proximity of the phone to the wearer enables it to receive voice commands while a speaker incorporated into the phone allows the wearer to hear sounds produced by the phone.

Figure 1:
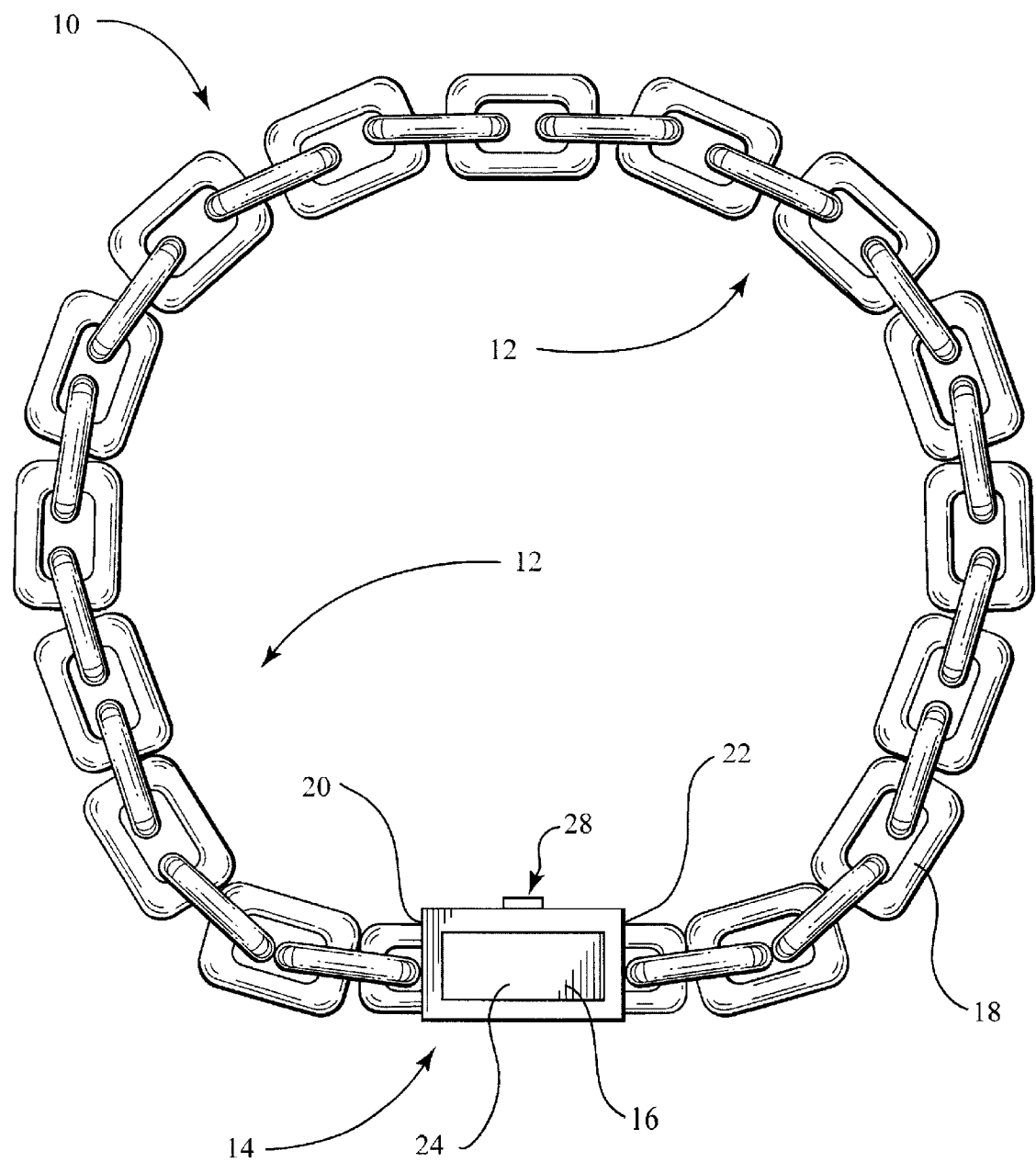
FIG. 1 is a front view of a wearable voice-activated mobile phone device.

Referring to FIG. 1, a wearable voice activated mobile phone jewelry device 10 comprises a necklace element 12 adapted to be worn around the neck of a person using the device 10. A battery powered self-contained voice activated mobile phone 14 capable of accepting voice commands and executing phone calls is contained within a decorative case 16 enclosing the mobile phone electronics. The case 16 preserves the phone below a user's mouth, and the decorative case 16 is attached to the necklace element 12.

Still referring to FIG. 1, in another preferred embodiment, the decorative case 14 comprises access 24 for sound produced by the phone to pass through the decorative case 14 and reach a wearer. The phone emits sound at a volume sufficient for a person wearing the device to hear an incoming signal at normal volume. The device 10 also comprises microphone access, wherein a microphone in the mobile phone detects voice commands from a person wearing the device. In one preferred embodiment, the speaker and microphone use the same access.

In another preferred embodiment of the invention, the decorative case 14 comprises button access (not shown) allowing a user to access button controls associated with the voice-activated mobile phone. In an alternate preferred embodiment, the decorative case 14 comprises at least one multifunction button for activating features of the mobile phone. In some instances, the decorative case 14 may be of a fanciful shape, or represent an article with distinct front and back sides. In these instances, at least one multifunction button for activating features of the phone is located on the back side of the decorative case.

Figure 2:
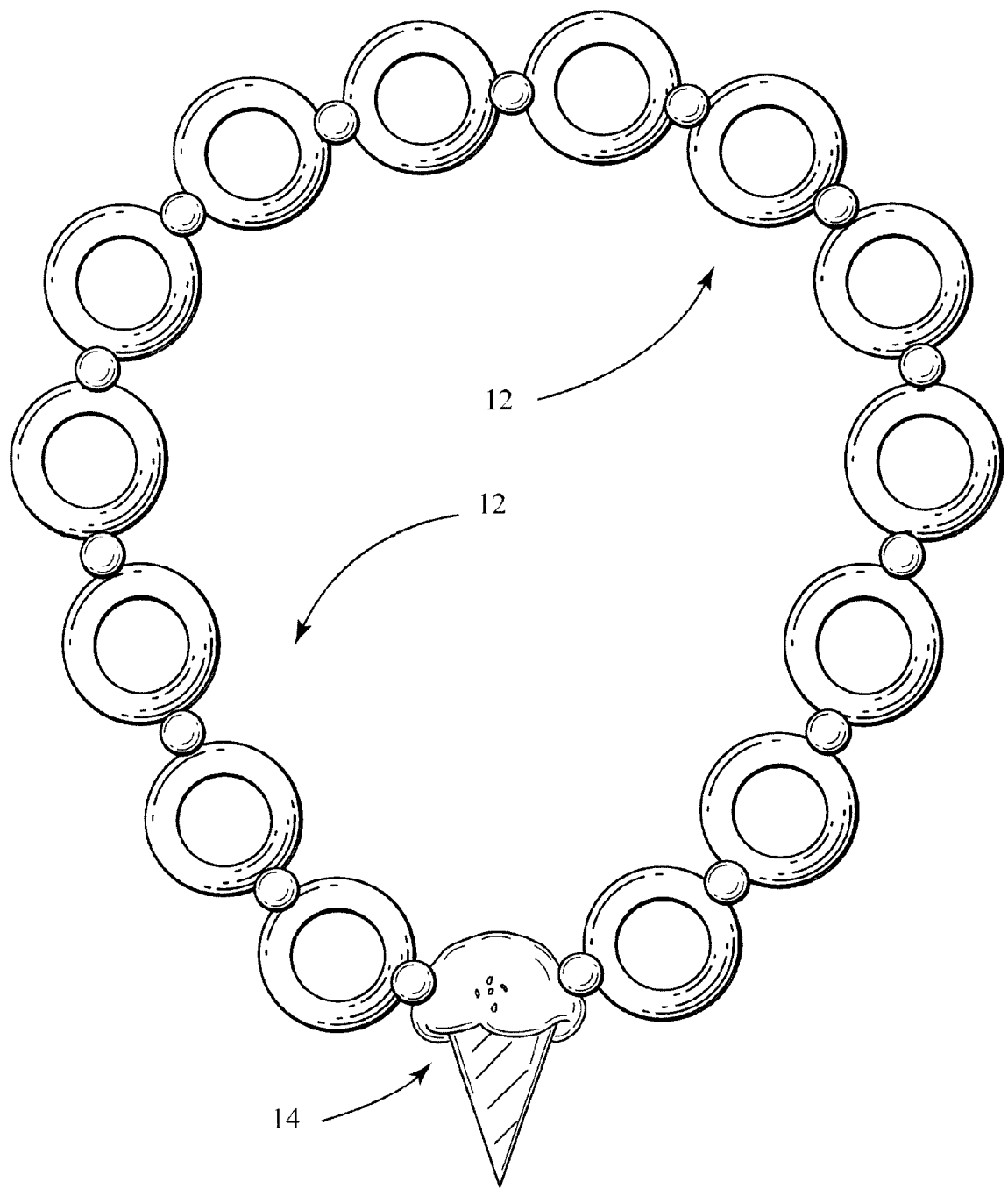
FIG. 2 is a front view of a wearable voice-activated mobile phone device, showing an alternative design to the ornamental characteristics of the device.

Referring to FIG. 2, the device may comprise costume jewelry and can therefore be constructed in a variety of forms and different styles. FIG. 2 shows one such alternate embodiment. In FIG. 2, the necklace element 12 comprises a creatively manufactured chain and the decorative case 14 comprises a fanciful shape; in this instance an ice cream cone.

Figure 3:
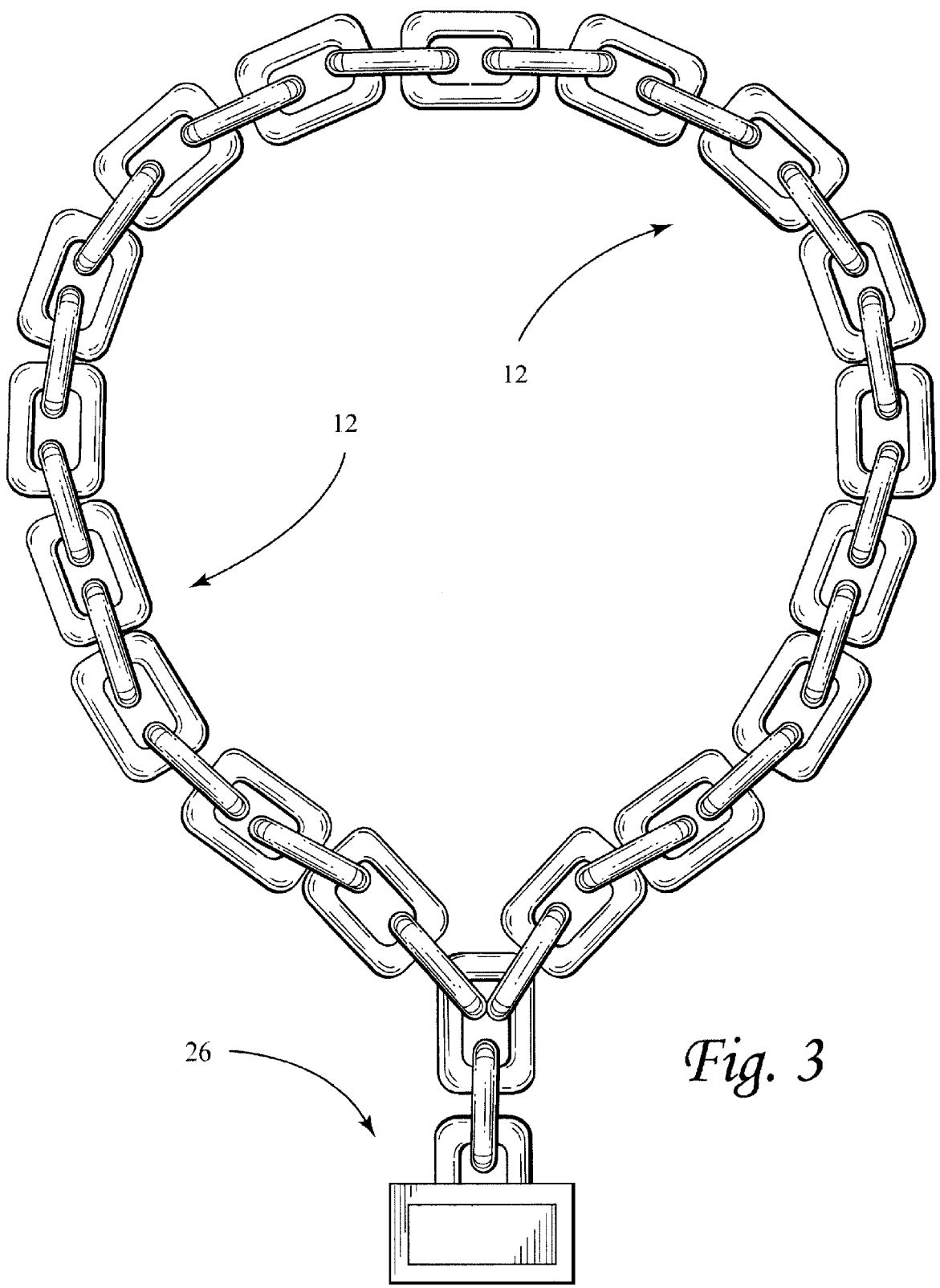
FIG. 3 is a front view of a wearable voice-activated mobile phone device, wherein the phone component of the device is a pendant.

The necklace element comprises first and second terminal ends wherein the decorative case is attached to the necklace element between the ends. In this manner, the decorative case becomes a part of the necklace element. Referring to FIG. 3, the decorative case is attached to the necklace element in a manner comprising a pendant 26 supported by the necklace element 12. In one preferred embodiment, the voice-activated mobile phone and decorative case comprise a retractable tether enabling a wearer to pull the case and phone away from the necklace element. In this embodiment the tether automatically retracts to a biased position when the case is released.

Figure 4:
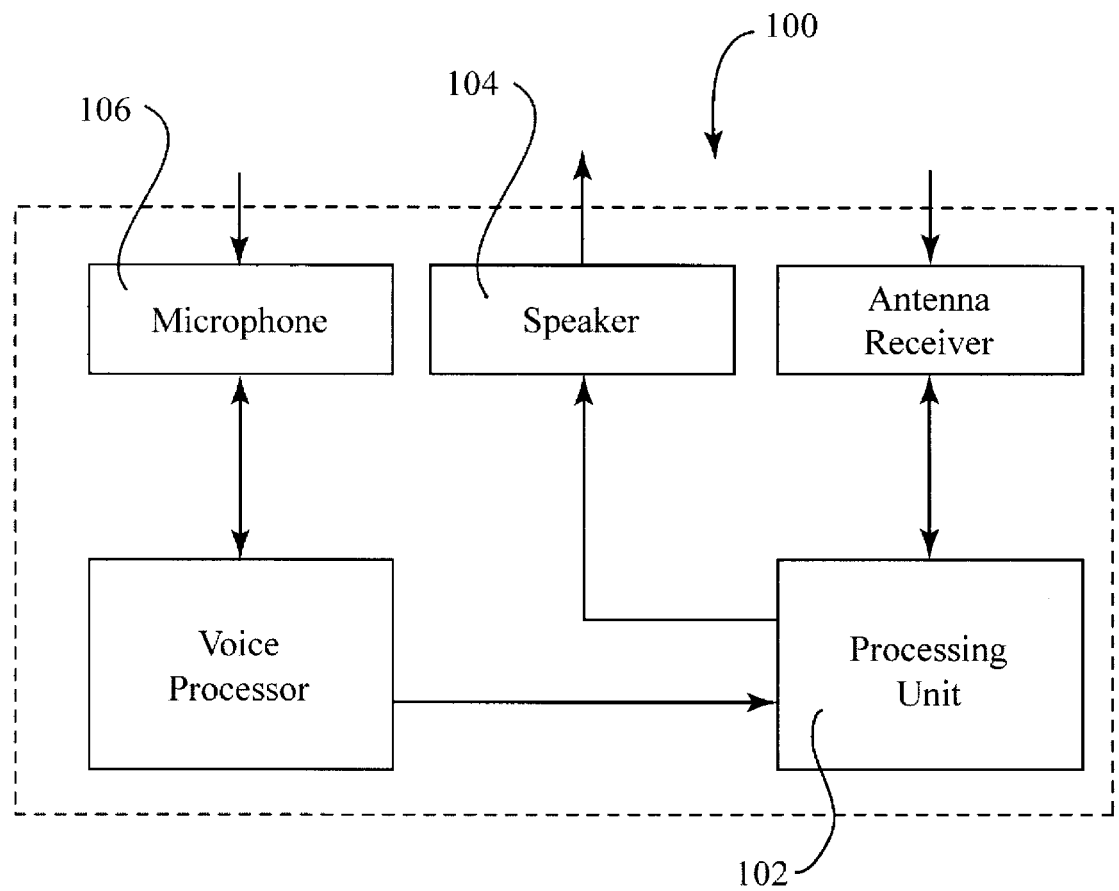
FIG. 4 is a block diagram of the mobile phone portion of the device.

Referring to FIG. 4, a block diagram shows the voice-activated mobile phone contained within the decorative element of the device. The voice-activated mobile phone comprises a processing unit 102, speaker 104 and microphone, 106 wherein the processing unit 102 is capable of deactivating the microphone 106 when the speaker is active, and reactivating the microphone when the speaker is deactivated. The processing unit 102 is also capable of distinguishing a wearer's voice from among other sounds.

In one preferred embodiment, the device comprises an input for connecting the device to a computer or other processing device capable of programming the voice-activated mobile phone. The device may also accept an audio plug for attaching a wired audio input/output device. In a further preferred embodiment, the input also allows a rechargeable battery in the device to recharge while plugged in. The device also may be capable of communications over an open wireless protocol with an associated electronic device.

In other preferred embodiments, the necklace element may comprise an antenna used by the mobile phone device to improve signal transmission. To enhance sound transmission, the device directs sound produced by the speaker toward the wearer of the device and receives sound from a selected direction proximate to the mouth of a wearer of the device.

All features disclosed in this specification, including any accompanying claims, abstract, and drawings, may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, paragraph 6. In particular, the use of "step of" in the claims herein is not intended to invoke the provisions of 35 U.S.C. §112, paragraph 6.

Although preferred embodiments of the present invention have been shown and described, various modifications and substitutions may be made thereto without departing from the spirit and scope of the invention. Accordingly, it is to be understood that the present invention has been described by way of illustration and not limitation.

What is claimed is:

1. A wearable voice activated hands-free mobile phone jewelry device comprising:
   a. a necklace element configured to extend around the neck of a user, the necklace element including a plurality of decorative link portions interlinked one with another;
   b. a self-contained voice activated hands-free mobile phone which communicates over an open wireless protocol with an associated electronic device to accept voice commands and execute phone calls therefrom, the mobile phone comprising a processing unit, speaker, microphone, voice processor, and antenna receiver, the processing unit deactivating the microphone when the speaker is active, and reactivating the microphone when the speaker is deactivated;
   c. at least one of said decorative link portions forming a decorative case enclosing the mobile phone, the decorative case transmitting therethrough user voice sounds to the phone, the decorative case being attached to the necklace element, the mobile phone being concealed within the decorative case and thereby disguised as a necklace link; and,
   at least a portion of the necklace element functioning as an antenna used by the voice-activated mobile phone to improve signal transmission.

2. The mobile phone jewelry device of claim 1 wherein the necklace element comprises a chain of links connecting at one end to a first part of the decorative case, and at the opposite end to a second part of the decorative case.

3. The mobile phone jewelry device of claim 1 wherein the decorative case comprises speaker access, the decorative case transmitting sounds originated by a speaker in the voice-activated mobile phone with sufficient volume to be audible to a person wearing the device.

4. The mobile phone jewelry device of claim 1 wherein the decorative case comprises microphone access, a microphone disposed in the voice-activated mobile phone detecting voice commands from a person wearing the device.

5. The mobile phone jewelry device of claim 1 wherein the decorative case comprises at least one multi-function button for activating features of the voice-activated mobile phone.

6. The mobile phone jewelry device of claim 1 wherein the necklace element and decorative case comprise costume jewelry.

7. The mobile phone jewelry device of claim 1 wherein the necklace element comprises a first terminal end and a second terminal end and the decorative case is attached to the necklace element between the first and second terminal ends.

8. The mobile phone jewelry device of claim 1 wherein the decorative case is attached to the necklace element in a manner comprising a pendant supported by the necklace element.

9. The mobile phone jewelry device of claim 1 wherein the voice-activated mobile phone comprises a processing unit distinguishing a wearer's voice from among other sounds.

10. The mobile phone jewelry device of claim 1 configured to direct sound produced by a speaker in the voice-activated mobile phone toward a wearer of the device.

11. The mobile phone jewelry device of claim 1 configured to captures sound from a selected direction proximate to the mouth of a wearer of the device.

12. The mobile phone jewelry device of claim 1 configured to accept audio from a wired audio input/output device separate from the phone.

13. The mobile phone jewelry device of claim 1 wherein the decorative case is attached to the necklace element in retractably tethered manner.

* * * * *